(12) United States Patent
Cohen

(10) Patent No.: US 8,320,620 B1
(45) Date of Patent: Nov. 27, 2012

(54) METHODS AND APPARATUS FOR ROBUST RIGID AND NON-RIGID MOTION TRACKING

(75) Inventor: Scott D. Cohen, Sunnyvale, CA (US)

(73) Assignee: Adobe Systems Incorporated, San Jose, CA (US)

(*) Notice: Subject to any disclaimer, the term of this patent is extended or adjusted under 35 U.S.C. 154(b) by 620 days.

(21) Appl. No.: 12/549,126

(22) Filed: Aug. 27, 2009

Related U.S. Application Data

(60) Provisional application No. 61/138,782, filed on Dec. 18, 2008.

(51) Int. Cl.
*G06K 9/00* (2006.01)

(52) U.S. Cl. .................. 382/103; 382/104; 382/107

(58) Field of Classification Search ............... 382/103, 382/104, 107
See application file for complete search history.

(56) References Cited

U.S. PATENT DOCUMENTS

| | | | |
|---|---|---|---|
| 7,177,486 B2 | 2/2007 | Stewart et al. | |
| 7,409,108 B2 | 8/2008 | Xu et al. | |
| 2003/0235337 A1* | 12/2003 | Paragios et al. | 382/215 |
| 2004/0019274 A1* | 1/2004 | Galloway et al. | 600/425 |
| 2010/0111370 A1* | 5/2010 | Black et al. | 382/111 |

OTHER PUBLICATIONS

B. Amberg, S. Romdhani, and T. Vetter, "Optimal step nonrigid icp algorithms for surface registration," In CVPR, 2007. http://gravis.cs.unibas.ch/publications/2007/CVPR07_Amberg.pdf.

Sunil Arya, David M. Mount, Nathan S. Netanyahu, Ruth Silverman, and Angela Wu, "An optimal algorithm for approximate nearest neighbor searching," In SODA '94: Proceedings of the fifth annual ACM-SIAM symposium on Discrete algorithms, pp. 573-582, 1994.
P.J. Besl and N.D. McKay, "A method for registration of 3-d shapes," PAMI, 14(2):239-256, Feb. 1992.
Y. Boykov, O. Veksler, and R. Zabih, "Fast approximate energy minimization via graph cuts," PAMI, 23(11):1222-1239, Nov. 2001, http://www.cs.cornell.edu/rdz/papers/bvz-iccv99.pdf.
Pedro F. Felzenszwalb and Daniel P. Huttenlocher, "Efficient belief propagation for early vision," International Journal of Computer Vision, 70(1), Oct. 2006, http://people.cs.uchicago.edu/~pff/papers/bp-long.pdf.
Martin A. Fischler and Robert C. Bolles, "Random sample consensus: a paradigm for model fitting with applications to image analysis and automated cartography," Commun. ACM, 24(6):381-395, Jun. 1981.

(Continued)

*Primary Examiner* — Tom Y Lu
(74) *Attorney, Agent, or Firm* — Robert C. Kowert; Meyertons, Hood, Kivlin, Kowert & Goetzel, P.C.

(57) ABSTRACT

Methods and apparatus for robust rigid and non-rigid motion tracking. An image, a next image, and a mask corresponding to an area in the image may be obtained. The area includes a plurality of points; each point indicates a location of the point in a position space and a color of the point in a color space. An iterative closest point algorithm may be applied that iteratively computes correspondences from a transformation and computes a new transformation from the correspondences. The algorithm tracks motion of the area in the image between the image and the next image. The algorithm matches points indicated by the mask to points in the next image in both position space and color space. An indication of an area in the next image that corresponds to the area in the image as tracked by the algorithm is generated.

20 Claims, 12 Drawing Sheets

OTHER PUBLICATIONS

David G. Lowe, "Object recognition from local scale-invariant features," ICCV, pp. 1150-1157, 1999, http://www.cs.ubc.ca/~lowe/papers/iccv99.pdf.

David G. Lowe, "Distinctive image features from scale-invariant keypoints," International Journal of Computer Vision, 60:91-110, 2004, http://www.cs.ubc.ca/~lowe/papers/ijcv04.pdf.

Scott Schaefer, Travis McPhail, and Joe Warren, "Image deformation using moving least squares," SIGGRAPH, 25 (3):533-540, 2006, http://faculty.cs.tamu.edu/schaefer/research/mls.pdf.

Jianbo Shi and Carlo Tomasi, "Good features to track," In CVPR, pp. 593-600, 1994.

John F. Hughes Takeo Igarashi, Tomer Moscovich, "As-rigid-as-possible shape manipulation," SIGGRAPH, 24(3), 2005, http://www-ui.is.s.u-tokyo.ac.jp/~takeo/papers/rigid.pdf.

J. Wills, S. Agarwal, and S. Belongie, "What went where [motion segmentation]," CVPR, 1:37-44, Jun. 2003.

M. Zuliani, C. S. Kenney, and B. S. Manjunath, "The multiransac algorithm and its application to detect planar homographies," In IEEE International Conference on Image Processing, Sep. 2005.

\* cited by examiner

*I*

*M*

$I_{next}$ rigid motion tracking algorithm
iteration 10 rigid motion tracking algorithm
iteration 11 rigid motion tracking algorithm
iteration 12 non-rigid motion
tracking algorithm
iteration 1

Non-rigid motion
tracking algorithm
iteration 23

METHODS AND APPARATUS FOR ROBUST RIGID AND NON-RIGID MOTION TRACKING

PRIORITY INFORMATION

This application claims benefit of priority of U.S. Provisional Application Ser. No. 61/138,782 entitled "Methods and Apparatus for Robust Rigid and Non-Rigid Motion Tracking" filed Dec. 18, 2008, the content of which is incorporated by reference herein in its entirety.

BACKGROUND

Description of the Related Art

Iterative Closest Point (ICP) methods are typically used to register point sets in 2D and 3D. Some conventional methods perform registration of 3D point sets with a single rigid transformation, docking a model within a target that is potentially a superset of the model. Some methods use extended ICP to find a non-rigid transformation for matching surfaces in 3D, using a different rigid transformation at each surface vertex and with a stiffness parameter for keeping transformations at nearby vertices similar.

For image matching with a single rigid transformation, a conventional technique uses the RANSAC algorithm on a sparse set of tracked feature points, as is done for example with SIFT feature points or "Good Features to Track." The input to RANSAC is a set of corresponding points, and RANSAC is robust to incorrect correspondences. A drawback of conventional sparse feature tracking approaches is that some objects/areas that the user may want to track may not have enough distinctive, trackable feature points.

Two related conventional works in non-rigid image deformation for animation are As-Rigid-As-Possible (ARAP) Shape Manipulation and Moving Least Squares Image Deformation. Both produce a non-rigid deformation of an image area from a set of sparse correspondences, and both constrain the non-rigid transformation so that the transformations undergone by nearby points are similar. In ARAP and MLS, an animator places a sparse set of control points on an image area to deform, and then moves the control points to generate a set of correspondences that will be used to generate a new image. For ARAP and MLS, there is only the single input image and an area to deform, and the output is a deformed area. Once the correspondences are known, both generate non-rigid transformations that interpolate the correspondences.

There are conventional RANSAC procedures that attempt to find multiple rigid transformations that explain a set of given correspondences. In a conventional motion estimation method, a set of proposed rigid transformations may be discovered from image feature point correspondences, and a labeling problem is solved to assign each pixel in the image to a candidate motion field. A data term D used in the labeling problem uses the color difference between a point r in I and the color in a next image at its transformed position.

SUMMARY

Various embodiments of methods and apparatus for robust rigid and non-rigid motion tracking are described. Various iterative closest point algorithms in a combined position and color space, which may be referred to as motion tracking algorithms, are described for performing robust rigid and non-rigid motion tracking Iterative Closest Point (ICP) is a type of algorithm that may be used to estimate transformation between two sets of points. Given two sets of points and an initial transformation, iterative closest point algorithms iteratively associate points by nearest neighbor criteria, estimate the parameters, for example using a mean square cost function, and transform the points using the estimated parameters. The output is a refined transformation. In embodiments, an image of a scene, a mask corresponding to an area in the image, and a next image of the scene may be obtained. The area includes a plurality of points; each point indicates a location of the point in a position space and a color of the point in a color space. An iterative closest point algorithm as described herein may be applied to the area in the image indicated by the mask and the next image. The iterative closest point algorithm tracks motion of the area in the image between the image and the next image. The iterative closest point algorithm matches points indicated by the mask to points in the next image in both position space and color space. An indication of an area in the next image that corresponds to the area in the image as tracked by the iterative closest point algorithm is generated.

The described motion tracking algorithms may be implemented in or as a motion tracking module. Given an image I, a selection mask M indicating an area selected in I, and a second image $I_{next}$, embodiments of the motion tracking module may locate the selected area in $I_{next}$. The images I and $I_{next}$ may, for example, be frames from a video, either adjacent in time or not adjacent in time, or simply images of a scene containing similar areas or objects. Embodiments of the motion tracking algorithms may track each point in M to find a corresponding location in $I_{next}$. To do so, embodiments may assume that the shape of the corresponding area in $I_{next}$ is similar to the shape of the selected area in I. The output is a spatial transformation A(r) at each point r in the selection M. The corresponding point in $I_{next}$ to r in I is the result A(r)r of applying the transformation A(r) to r. Given A(r), embodiments may generate a mask of the predicted selection in $I_{next}$.

In embodiments of a rigid motion tracking algorithm, each point in M may be required to undergo the same rigid transformation, and thus the output is a single transformation. In embodiments of a non-rigid motion tracking algorithm, each point in M may be allowed to undergo a different, but still rigid, transformation and the output may be a set of rigid transformations, with one transformation for each point in M. Some embodiments of the non-rigid motion tracking algorithm may allow a potentially different rigid transformation at each pixel in the selection M. Alternatively, in some embodiments, only a small, fixed number of rigid transformations may be allowed. Each point to track may be assigned to a group, and the motion of each group of points may be modeled with a single rigid transformation. Embodiments of a group tracking algorithm are described that may alternate between using the rigid motion tracking algorithm on each of the current groups and estimating new groups based on the transformations. In embodiments of the group tracking algorithm, the multiple groups/rigid transformations may describe a single selected area, and the algorithm may iterate the process to find new transformations based on the computed labeling.

In some embodiments, a motion tracking module that implements at least one of the motion tracking algorithms obtains a set of two or more input images and an initial mask corresponding to an object in an initial one of the images to be tracked across the other images. The motion tracking module may apply one of the motion tracking algorithms to the input images to generate masks that track movement of the object across the images. If there is more than one input image for which motion is to be tracked, the new mask may be applied to a third image, and so on, to generate a sequence of masks for the set of input images that track motion of the object across the images.

Some embodiments may use other features, properties or characteristics of points in images in combination with spatial information instead of or in addition to color information in the iterative closest point algorithms. For example, some embodiments may use a vector of texture values, for example computed using filters, in combination with spatial information in a nearest neighbor searching technique. As another example, some embodiments may use a binary edge indicator in combination with spatial information in a nearest neighbor searching technique. Some embodiments may use two or more features in combination with spatial information in a nearest neighbor searching technique.

Figure 1:
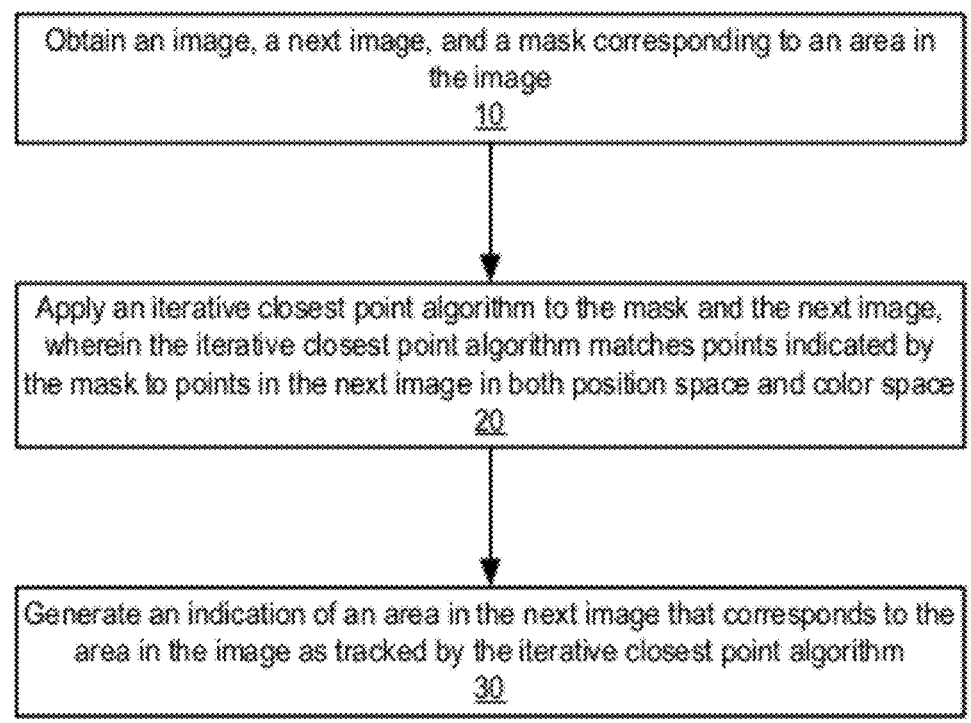
FIG. 1 is a high-level flowchart of a motion tracking method for tracking motion across two or more images, according to embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 11:
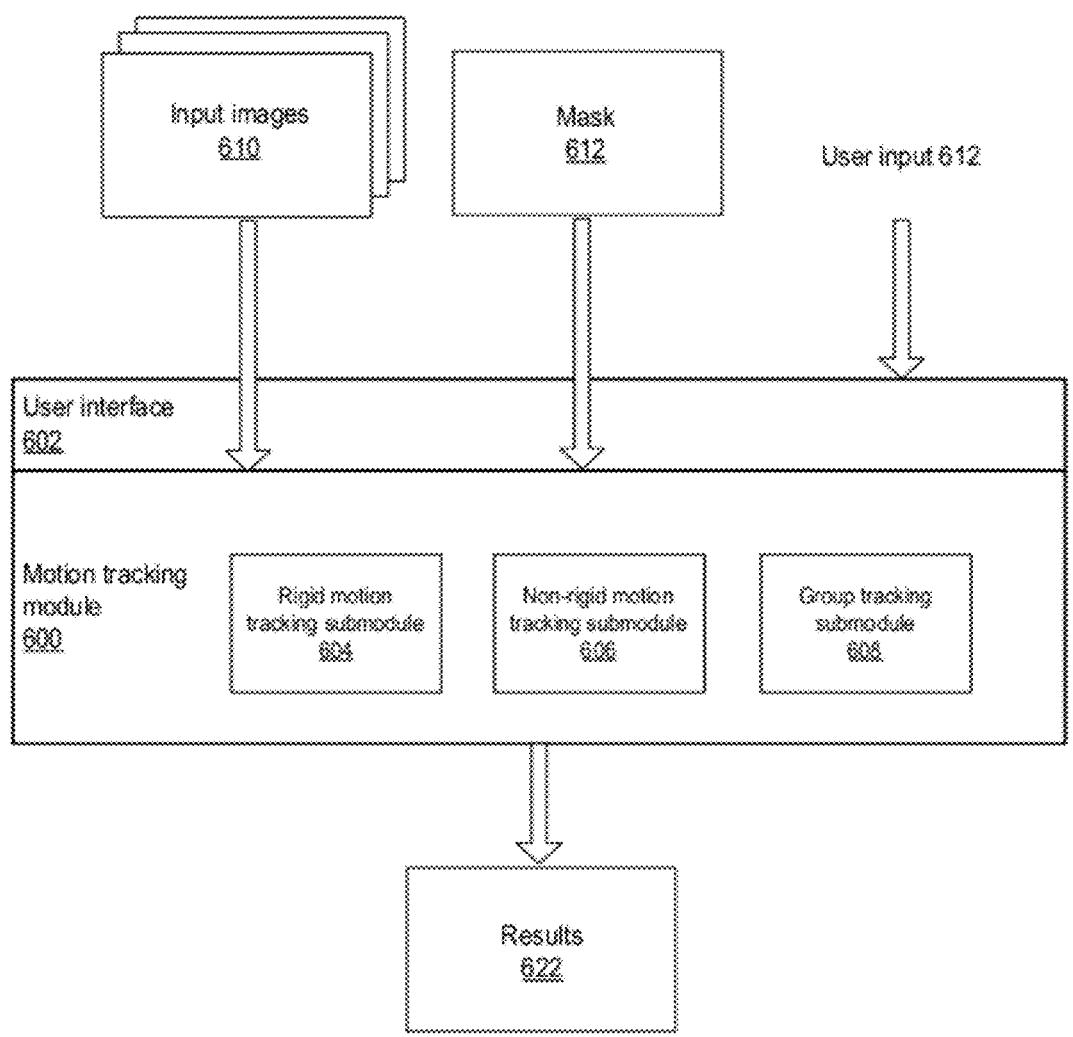
FIG. 11 illustrates an example embodiment of a motion tracking module.

Various embodiments of methods and apparatus for robust rigid and non-rigid motion tracking are described. Various iterative closest point algorithms in a combined position and color space, which may be referred to as motion tracking algorithms, are described for performing robust rigid and non-rigid motion tracking Iterative Closest Point (ICP) is a type of algorithm that may be used to estimate transformation between two sets of points. Generally, given two sets of points and an initial transformation, iterative closest point algorithms iteratively associate points by nearest neighbor criteria, estimate the parameters, for example using a mean square cost function, and transform the points using the estimated parameters. The output is a refined transformation. The described motion tracking algorithms, alone or in combination with one or more others of the motion tracking algorithms, may be implemented in or as a motion tracking module. FIG. 11 illustrates an example embodiment of a motion tracking module. Embodiments of the motion tracking module may, for example, be executed on a computer device or computer system, an example of which is provided in FIG. 12. While embodiments are generally described that employ iterative closest point algorithms in a combined position and color space for performing robust rigid and non-rigid motion tracking, some embodiments may use other features, properties or characteristics of points in images in combination with spatial information instead of or in addition to color information in the iterative closest point algorithms.

FIG. 2 is a high-level flowchart of a motion tracking method for tracking motion across two or more images that may be implemented in a motion tracking module, according to embodiments. As indicated at 10, an image of a scene, a mask corresponding to an area in the image, and a next image of the scene may be obtained. The area includes a plurality of points; each point indicates a location of the point in a position space and a color of the point in a color space. As indicated at 20, an iterative closest point algorithm may be applied to the area in the image indicated by the mask and the next image. The iterative closest point algorithm tracks motion of the area in the image between the image and the next image. The iterative closest point algorithm matches points indicated by the mask to points in the next image in both position space and color space. As indicated at 30, an indication of an area in the next image that corresponds to the area in the image as tracked by the iterative closest point algorithm may be generated.

Figure 2A:
FIGS. 2A through 2C show an image I, a selection mask M indicating an area selected in I, and a second image $I_{next}$, respectively, as examples of input to implementations of a motion tracking algorithm.
Figure 2B:
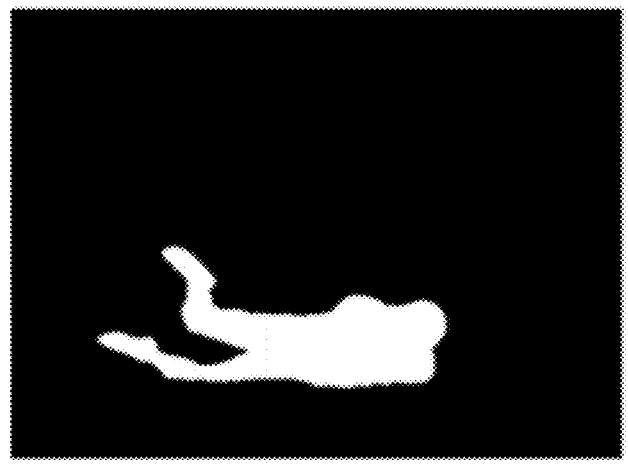
Figure 2C:
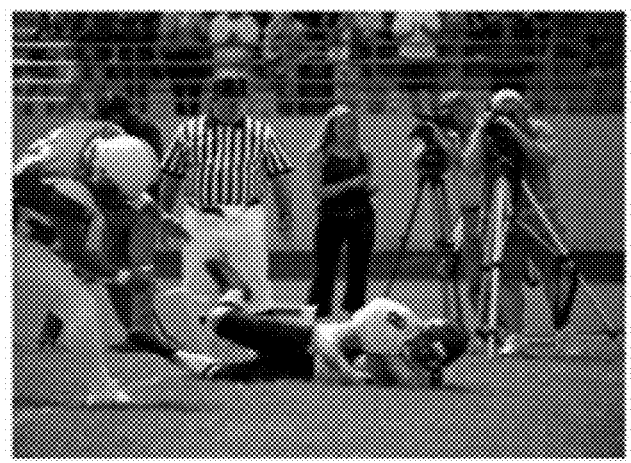

Given an image I, a selection mask M indicating an area selected in I, and a second image $I_{next}$, embodiments of a motion tracking module may locate an area in $I_{next}$ that corresponds to the area in I indicated by the selection mask. The images I and $I_{next}$ may, for example, be frames from a video, either adjacent in time or not adjacent in time, or simply images of a scene containing similar areas or objects. FIGS. 2A through 2C show an image I, a selection mask M indicating an area selected in I, and a second image $I_{next}$, respectively, as examples of input to implementations of embodiments of the motion tracking algorithms described herein. These images and other images used herein are courtesy of the Artbeats Digital Film Library, Artbeats, Inc.

More precisely, embodiments of the motion tracking algorithms described herein, implemented in embodiments of a motion tracking module, may track each point in M to find a corresponding location in $I_{next}$. To do so, embodiments may assume that the shape of the corresponding area in $I_{next}$ is similar to the shape of the selected area in I. The output is a spatial transformation A(r) at each point r in the selection M. The corresponding point in $I_{next}$ to r in I is the result A(r)r of applying the transformation A(r) to r. Given A(r), embodiments may generate a mask of the predicted selection in $I_{next}$.

Figure 3:
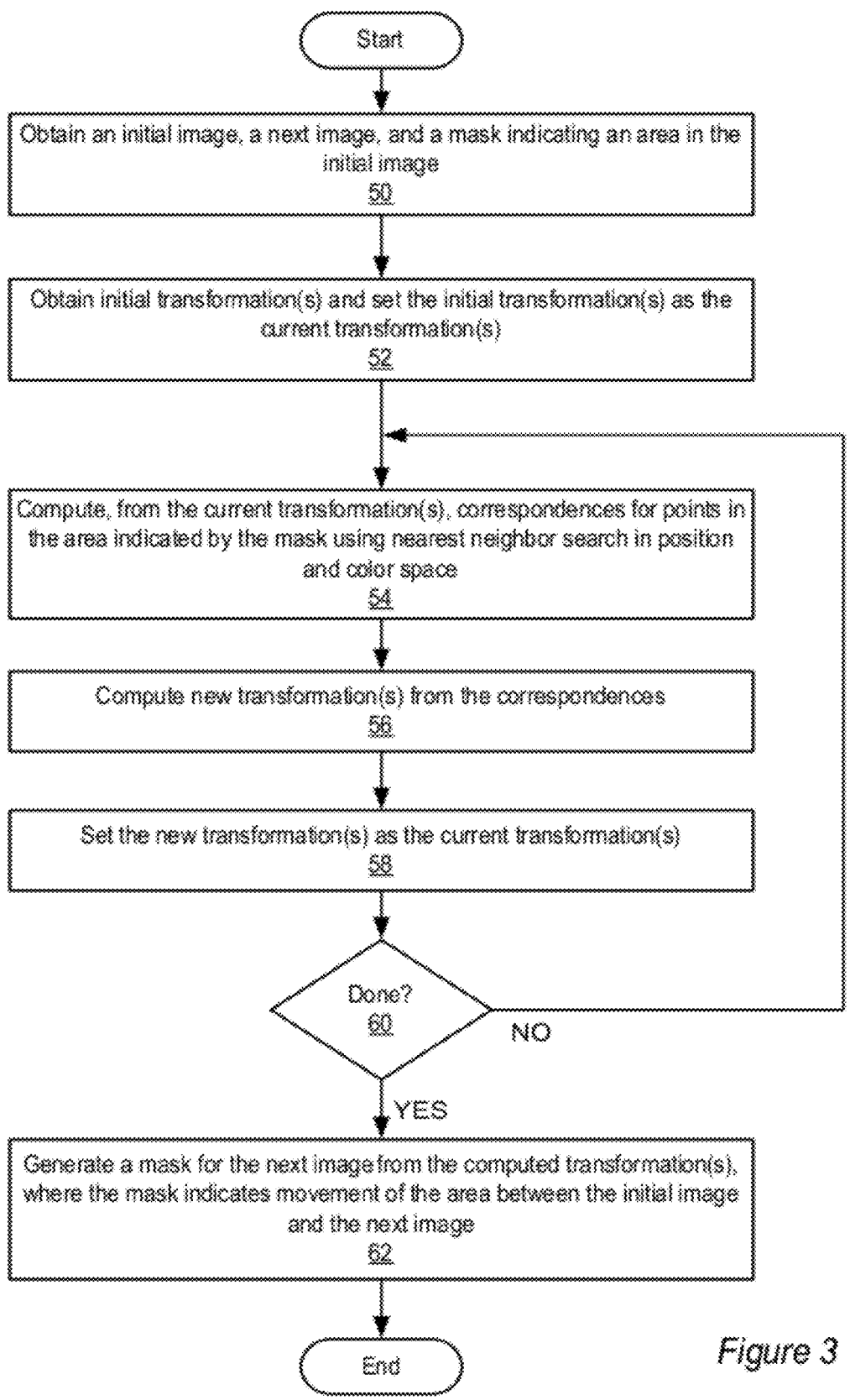
FIG. 3 is a flowchart of a general motion tracking method for tracking motion across two or more images, according to embodiments.

FIG. 3 is a flowchart of a general motion tracking method for tracking motion across two or more images, according to embodiments. The general motion tracking method may employ an iterative closest point (ICP)-style algorithm in position and color space for image matching and motion tracking. An ICP algorithm in position and color space implements nearest neighbor searching not just in position space (i.e., using spatial information for the points) as in conventional methods, but in color space as well (i.e. using color information for the points). The motion tracking method may be performed by a motion tracking module implemented by program instructions stored in a computer-readable storage medium and executable by one or more processors (e.g., one or more CPUs and/or GPUs). FIG. 11 illustrates an example embodiment of a motion tracking module that may implement embodiments of the motion tracking method. Embodiments of the motion tracking module may, for example, be executed on a computer device or computer system, an example of which is provided in FIG. 12.

As indicated at 50 of FIG. 3, an initial image, a next image, and a mask indicating an area in the initial image may be obtained. The images may, for example, be frames from a video, either adjacent in time or not adjacent in time, or simply captured images of a scene containing similar areas or objects. FIGS. 2A through 2C show an initial image I, a selection mask M indicating an area selected in I, and a second image $I_{next}$, respectively, as examples of input to the general motion tracking method. As indicated at 52 of FIG. 3, initial transformation(s) that specify transformation(s) at points in the mask may be obtained. The initial transformation(s) are set as current transformation(s).

Elements 54 through 60 of FIG. 3 illustrate application of an ICP-style algorithm in position and color space according to some embodiments. As indicated at 54, correspondences for points in the area indicated by the mask may be computed from the current transformation(s) using nearest neighbor search in position and color space. As indicated at 56, new transformation(s) are computed from the correspondences. In some embodiments, a least squares estimation technique may be used to compute the new transformation(s) from the correspondences. However, other techniques than least squares estimation may be used to compute the new transformation(s) from the correspondences in embodiments. For example, a RANSAC algorithm or some other robust optimization algorithm that takes as input the correspondences and outputs a transformation may be used. As indicated at 58, the new transformation(s) are set as the current transformation(s). As indicated at 60, elements 54, 56 and 58 may be repeated until done. The algorithm may determine that the process is done by checking to see if one or more criteria are satisfied. The one or more criteria may include, but are not limited to, one or more convergence criteria and an iteration count. A test to determine if the iteration is done may include either checking to see if the algorithm has converged according to one or more criteria or checking to see if the iteration count has reached a specified iteration threshold, or may include checking both conditions. Thus, elements 54, 56 and 58 may be repeated until the algorithm converges and/or until a specified number of iterations have been performed. The output is a spatial transformation at each point in the selection mask. The corresponding point in the next image to a point in the initial image is the result of applying the respective spatial transformation to the point in the initial image. As indicated at 62, a mask for the next image may be generated from the computed transformation. The generated mask indicates movement of the area of the initial image indicated by the initial mask between the two images.

Embodiments may test for convergence using various methods. For example, in some embodiments, the algorithm may be considered to have converged if the correspondences do not change from one iteration to the next. In another embodiment, an algorithm may be considered to have converged if the positions of the transformed points do not change by more than a specified threshold distance, e.g. 0.1 pixels. In yet another embodiment, the algorithm may be considered to have converged if either the correspondences do not change from one iteration to the next or the positions of the transformed points do not change by more than a specified threshold distance, e.g. 0.1 pixels. Other methods may be used to test for convergence in various embodiments.

Embodiments of the general motion tracking method illustrated in FIGS. 2 and 3 may implement a rigid motion tracking algorithm, a non-rigid motion tracking algorithm, or a group tracking algorithm as described herein. In a rigid motion tracking algorithm, each point in M may be required to undergo the same rigid transformation, and thus the output is a single transformation. In a non-rigid motion tracking algorithm, each point in M may be allowed to undergo a different, but still rigid, transformation and the output may be a set of rigid transformations, one for each point in M. In a group tracking algorithm, points in M may be grouped into two or more groups each including two or more points, and the motion of each group of points may be modeled with a different, but rigid, transformation.

Some embodiments of the motion tracking module may enforce the assumption of similar shapes and regularize the non-rigid problem by adding a stiffness parameter to penalize large changes in the transformations A(r) over small distances.

Embodiments of the motion tracking algorithms described herein may not require the existence of distinctive feature points, and thus may be used to track largely homogeneous areas/objects without corners or texture. Embodiments may not rely on landmark points, and may discover correspondences automatically during an iteration process. In addition, embodiments may discover the correspondences, and the computation of the rigid or non-rigid transformation may not assume that all the correspondences are correct. Embodiments may use a rigidity measure and trade off between obeying/interpolating the correspondences and producing a non-rigid transformation that is still somewhat rigid according to the stiffness parameter. This tradeoff may allow for an iterative closest point (ICP)-style iteration that, with each iteration, progresses toward discovering the corresponding area in $I_{next}$.

Embodiments of a non-rigid motion tracking algorithm described herein, for example as shown in the example pseudocode titled NonRigidICPTrackMaskPoints, may use color information associated with each position in the matching process, and may employ an ICP-style algorithm in position and color space for image matching and motion tracking.

In embodiments of a group tracking algorithm described herein, for example as shown in the example pseudocode titled GroupICPTrackMaskPoints, the multiple groups and corresponding rigid transformations may describe a single selected area, and the algorithm may iterate the process to find new transformations based on the computed labeling. Thus, embodiments of the group tracking algorithm may not rely on the existence of trackable feature points, and in some embodiments a match error may be used in a combined position and color space to define a data term used in a formulation of a labeling problem or in a formulation of a grouping problem.

Embodiments may robustly track an area or object over large distances and in images with a large amount of background clutter and distraction. Embodiments may use an iterative closest point (ICP) algorithm that alternates between optimal transformation task (T1): given fixed transformations, finding the best matches in $I_{next}$ for each point r in M, and optimal transformation task (T2): given fixed correspondences, finding the best transformations for the points in the selection. Embodiments may perform (T1) by solving a nearest neighbor problem in position and color space so that points in I are matched to points in $I_{next}$ that are similar in color and close in position after applying the current transformation estimate.

Performing (T2) is different for the rigid case and the non-rigid case. In both cases, there is a set of points $R=\{r_i\}_{i=1}^{n}$ and $Z=\{z_i\}_{i=1}^{n}$ of corresponding locations $r_i$ and $z_i$ in I and $I_{next}$. In the rigid case, in some embodiments, the Euclidean distance squared may be used, and the following (equation (1)) may be solved:

$$A^* = \underset{A}{\operatorname{argmin}} \sum_{i=1}^{n} \|Ar_i - z_i\|_2^2 \quad (1)$$

Such problems may be easily solved when the underlying allowable rigid transformations are affine transformations, similarity transformations (allows rotation, translation, and uniform scaling), Euclidean transformations (allows both rotation and translation), full perspective transformations, or even just simple translations such as a translation that moves all the points by a constant amount. Various embodiments may thus use, but are not limited to, any one of affine transformation, similarity transformation, Euclidean transformation, perspective transformation, and simple translations to perform the transformations described herein. Other formulations of the optimal transformation problem given the correspondences are possible, for example a robust procedure such as RANSAC.

In the non-rigid case, there is an additional term in the object function for the optimal transformation task that penalizes large differences in the transformations for nearby pixels, as shown in equation (2):

$$\{A^*(r_i)\} = \arg\underset{\{A(r_i)=(a_{kl}(r_i))\}}{\min} \sum_{i=1}^{n} \|A(r_i)r_i - z_i\|_2^2 + \alpha \sum_{i=1}^{n} \sum_{k,l} \|\gamma_{kl} \nabla a_{kl}(r_i)\|_2^2 \quad (2)$$

In this case, a different transformation is computed at each point $r_i$ in M. In equation (2), it is assumed that the allowable transformations A at each pixel are described by a set of parameters matrix $a_{kl}$. Various embodiments may use, but are not limited to, any one of affine transformation, similarity transformation, Euclidean transformation, perspective transformation, and simple translations to perform the transformations. Two dimensional indices kl may be used in some embodiments since, in the common cases of affine, similarity, Euclidean, or simple translations, the allowable transformations may be described by a 2×3 matrix $A=(a_{kl})$. If a 2D point (x, y) is represented as a column vector $[x\ y\ 1]^T$, then applying the transformation A is matrix multiplication. Using simple finite differences to measure the gradients $\nabla a_{kl}(r_i)$ results in a large sparse linear system to solve for the unknown transformations. The constants $\gamma_{kl}$ allow different components (e.g. a translation component and a rotation component) to be adjusted for different orders of magnitude and importance.

Although the Euclidean distance squared may be used in some embodiments to measure position differences in the optimal transformation tasks (T1) and (T2), other distance measures (e.g. the Euclidean distance or the $L_1$ city block distance) may be used in embodiments of the algorithms, although this may result in more difficult functions to optimize. For the non-rigid optimization task (T2), the second term:

$$\sum_{k,l} \|\gamma_{kl} \nabla a_{kl}(r_i)\|_2^2$$

is a measure of how quickly transformations are changing over space, and this measure may be used in at least some embodiments. Other measures of transformation difference may be used in some embodiments. Embodiments of an ICP framework as described herein can accommodate other measures as long as the analogous optimization problem presented in (T2) can be solved.

Some embodiments of the non-rigid motion tracking algorithm may allow a potentially different rigid transformation at each pixel in the selection M. Alternatively, in some embodiments, only a small, fixed number of rigid transformations may be allowed. This may be a better model for articulated objects with a handful of rigid components, such as the human body. Each point to track may be assigned to a group, and the motion of each group of points may be modeled with a single rigid transformation. Embodiments of a group tracking algorithm described herein may alternate between using the rigid motion tracking algorithm on each of the current groups and estimating new groups based on the transformations.

Rigid Motion Tracking Algorithm

Figure 4:
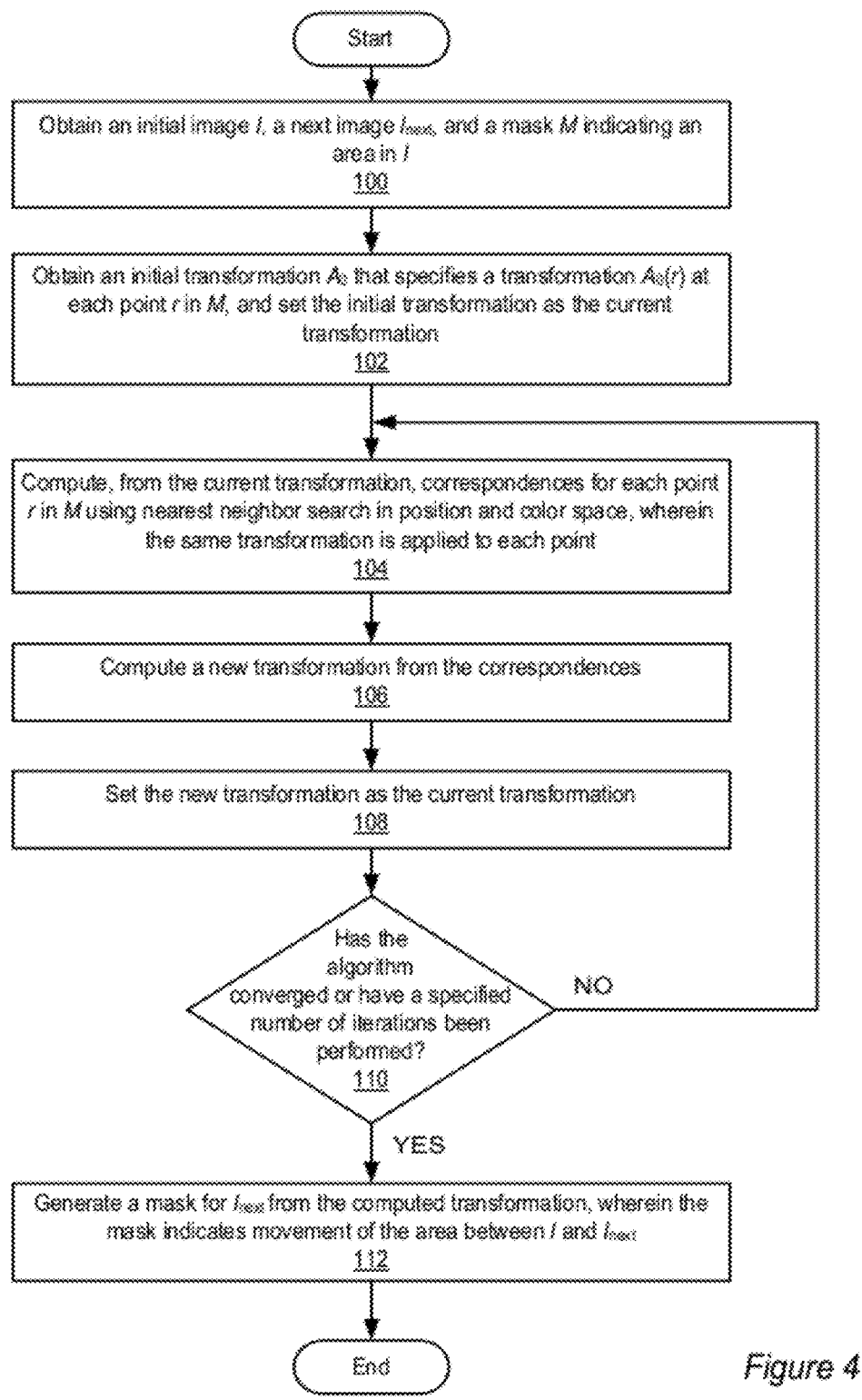
FIG. 4 is a flowchart of a rigid motion tracking method for tracking motion across two or more images, according to some embodiments.

FIG. 4 is a flowchart of a rigid motion tracking method for tracking motion across two or more images, according to some embodiments. The rigid motion tracking method may be performed by a motion tracking module implemented by program instructions stored in a computer-readable storage medium and executable by one or more processors (e.g., one or more CPUs and/or GPUs).

As indicated at 100, an initial image I, a next image $I_{next}$, and a mask M indicating an area in I may be obtained. The images I and $I_{next}$ may, for example, be frames from a video, either adjacent in time or not adjacent in time, or simply images of a scene containing similar areas or objects. FIGS. 2A through 2C show an image I, a selection mask M indicating an area selected in I, and a second image $I_{next}$, respectively, as examples of input to the rigid motion tracking method. As indicated at 102, an initial transformation $A_0$ that specifies a transformation $A_0(r)$ at each point r in M may be obtained. The initial transformation is set as the current transformation.

As indicated at 104, correspondences for each point r in M may be computed from the current transformation using nearest neighbor search in position and color space. The same transformation is applied to each point r in M. As indicated at 106, a new transformation is computed from the correspondences. As indicated at 108, the new transformation is set as the current transformation.

At 110, a check is made to see if the algorithm has converged or if a specified number of iterations have been performed. If not, the method returns to 104. If so, the method proceeds to 112. Thus, elements 104, 106 and 108 may be repeated until the algorithm converges or until a specified number of iterations have been performed. Embodiments may test for convergence using various methods, as previously described.

At 112, a mask for $I_{next}$ may be generated from the computed transformation. The generated mask indicates movement of the area in I indicated by the initial mask M between I and $I_{next}$.

The following pseudocode for an embodiment of a rigid motion tracking algorithm, referred to as RigidICPTrackMaskPoints, is provided as an example, and is not intended to be limiting. The rigid motion tracking algorithm may be performed by a motion tracking module implemented by program instructions stored in a computer-readable storage medium and executable by one or more processors (e.g., one or more CPUs and/or GPUs):

function A =

$$\text{RigidICPTrackMaskPoints}\left(I, M, I_{next} \begin{bmatrix} A_0, B_{next}^{con}, \\ \text{max\_motion\_in\_pixels}, \\ \text{max\_track\_points} \end{bmatrix}\right)$$

if (!exist($A_0$)) $A_0$:=identity transformation
if (!exist($B_{next}^{con}$)) $B_{next}^{con}$(x, y):=0 $\forall$(x, y)
if (!exist(max_motion_in_pixels)) max_motion_in_pixels:=$\infty$
R:={(x,y):M(x,y)=1}
if (exist(max_track_points) and |R|>max_track_points)
  R:=PickSubsetOfSize(R, max_track_points)
end if
R={$r_i$}$_{i=1}^n$
S:={(x,y):0$\leq$x<cols, 0$\leq$y>rows}
S:=S$\cap B_{next}^{con}$
D:=DistanceTransform(M)
S:=S$\cap${(x, y): D(x, y)$\leq$max_motion_in_pixels}={$s_j$}$_{j=1}^N$
$S^c$:={($s_j$, $\lambda I_{next}(s_j)$)}$_{j=1}^N$={$s_j^x$,$s_j^u$, $\lambda R_{next}$ ($s_j$), $\lambda G_{next}$ ($s_j$), $\lambda B_{next}$ ($s_j$)}={$s_j^c$}
A:=$A_0$
for iter=1:max_iterations
  // Solve for optimal correspondences ($r_i$, $s_{m(i)}$) given transformation A
  $u_i$=A$r_i$ $\forall$i=1, ... , n
  $R_c$:={$u_i^x$,$u_i^y$$\lambda R(r_i)$,$\lambda G(r_i)$,$\lambda B(r_i)$}={$r_i^c$}$_{i=1}^n$
  for i=1:n
    $s_{m(i)}^c$:=arg min$_{s^c \in S^c}$||$r_i^c$-$s^c$||$_2^2$
  end for
  $S^m$={$S_{m(i)}$}$_{i=1}^n$ $\subset$ $R^2$// R signifies the set of real numbers
  if (converged) break
  // Solve for optimal transformation A given correspondences ($r_i$, $s_{m(i)}$)
  A*:=arg min$_A$ $\Sigma_{i=1}^n$||A$r_i$-$s_{m(i)}$||$_2^2$
  A:=A*
end for
end RigidICPTrackMaskPoints Referring to the above example pseudocode for a rigid motion tracking algorithm, I corresponds to (R,G,B), and $I_{next}$ corresponds to ($R_{next}$, $G_{next}$,$B_{next}$). Optional input parameters are shown in brackets. The input $A_0$ specifies an initial value for the matching transformation. The closer the iteration starts to the true answer, the faster it will converge, and the less likely it will be to get stuck in an undesirable local minimum. In some embodiments, if the caller has knowledge of a good starting transformation, then the starting transformation can be passed as $A_0$. If not, then the identity transformation for $A_0$ may be used. The optional input $B_{next}^{con}$ is a mask indicating pixels in $I_{next}$ that are constrained not to be in the selection, i.e. pixels constrained to be background. These are points that should not be matched to points in M, and some embodiments may remove these points from the potential match set S. This input may be useful, for example, in a selection in a video system that allows the user to mark areas that are known to be in the selection or in the background. In some embodiments, if $B_{next}^{con}$ is not supplied, then it may be assumed that there are no points in $I_{next}$ that are constrained to be background.

The optional input max_motion_in_pixels may be used to specify the largest allowable distance in pixels between matching points in I and $I_{next}$. In some embodiments, the distance D(x, y) of the nearest pixel in M to (x, y) may be computed (e.g., in the DistanceTransform call) and pixels in $I_{next}$ which are farther than max_motion_in_pixels pixels from M may be removed from the potential match set S. This input may be useful, for example, in tracking an object that is known to be moving slowly, since a small value for max_motion_in_pixels can be passed to help reduce potential incorrect matches to background clutter. This may, for example, help to lessen the potentially harmful effects of background color, as it may remove ambiguities from the matching process. In some embodiments, if max_motion_in_pixels is not supplied, then it may be assumed that there is no constraint on the motion, and max_motion_in_pixels may be set to infinity. Embodiments of the algorithm may be robust and may, using a small subset of points from M, find the correct transformation. The optional input max_track_points may specify the maximum number of points to track. In some embodiments, if max_track_points is not provided, then all the points in M may be tracked. Otherwise, a subset of max_track_points may be selected in the call to PickSubsetOfSize. This subset may contain points from all areas of M.

In some embodiments, each iteration of the loop first computes the optimal correspondences ($r_i$, $s_{m(i)}$) using nearest neighbor search in position and color space for a fixed transformation A, and then finds the optimal transformation A* for fixed correspondences ($r_i$, $s_{m(i)}$). Outside the loop, the set of points $S^c$ in position and color space is formed that contains the positions of candidate match locations $s_j$ and the colors at locations $s_j$ with a factor of λ used to trade off the importance (and magnitudes) of the position and color. For the current transformation A, some embodiments may compute the set $R^c = \{r_i^c\}$ of points in position and color space for the points $r_i$ in the mask M after these points have been transformed by A (the transformed locations are denoted by $u_i$ in the pseudocode). Then the nearest neighbor in $S^c$ in position and color space for each $r_i^c$ may be found, in some embodiments using a method for approximate nearest neighbor searching.

In some embodiments, a rigid motion tracking algorithm (e.g., RigidICPTrackMaskPoints) may return the computed matches $\{s_{m(i)}\}$ in $I_{next}$ and/or the transformed positions $\{u_i\}$ of the selection points $r_i \in M$ to an interested caller. The same is true for a non-rigid motion tracking algorithm (e.g., NonRigidICPTrackMaskPoints) and group tracking algorithm (e.g., GroupICPTrackMaskPoints) described in subsequent sections. However, for the sake of simplicity, this is not shown in the example pseudocode for these algorithms.

Embodiments may test for convergence using various methods. For example, in some embodiments, the algorithm may be considered to have converged if the correspondences do not change from one iteration to the next. In another embodiment, the algorithm may be considered to have converged if the positions of the transformed points do not change by more than a specified threshold distance, e.g. 0.1 pixels. In yet another embodiment, the algorithm may be considered to have converged if either the correspondences do not change from one iteration to the next or the positions of the transformed points do not change by more than a specified threshold distance, e.g. 0.1 pixels. Other methods may be used to test for convergence in various embodiments.

Figure 5A:
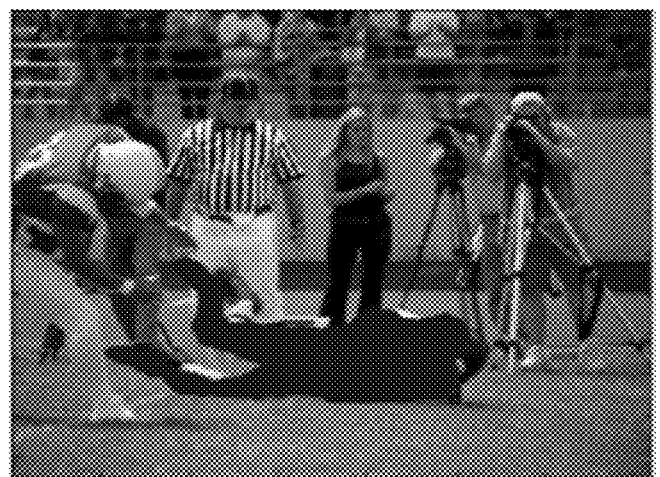
FIGS. 5A through 5F show example results of an embodiment of a rigid motion tracking algorithm on the image sequence shown in FIGS. 2A through 2C.
Figure 5B:
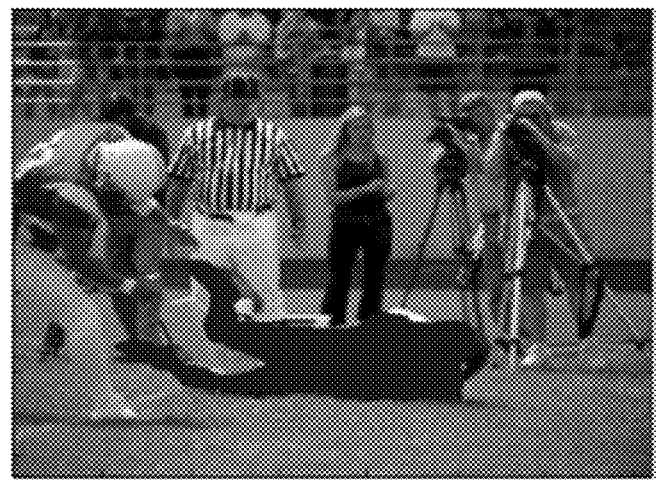
Figure 5C:
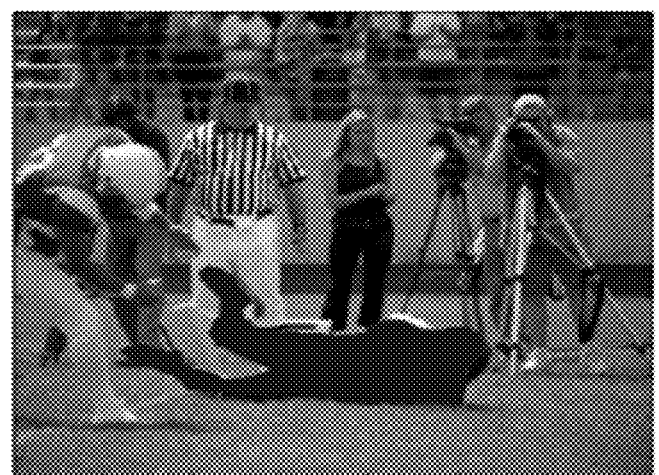
Figure 5D:
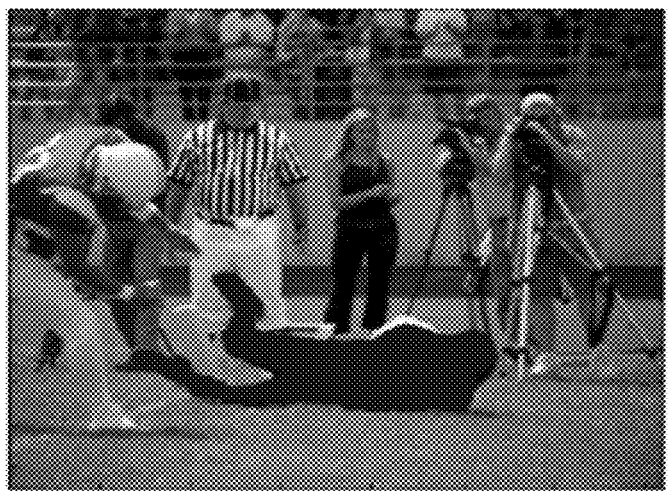
Figure 5E:
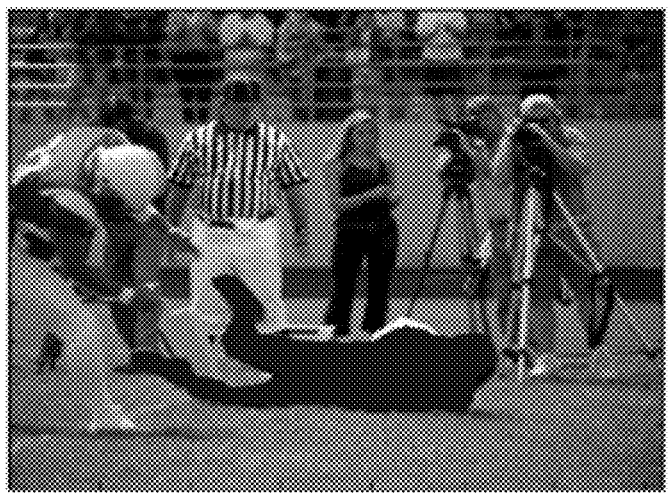
Figure 5F:
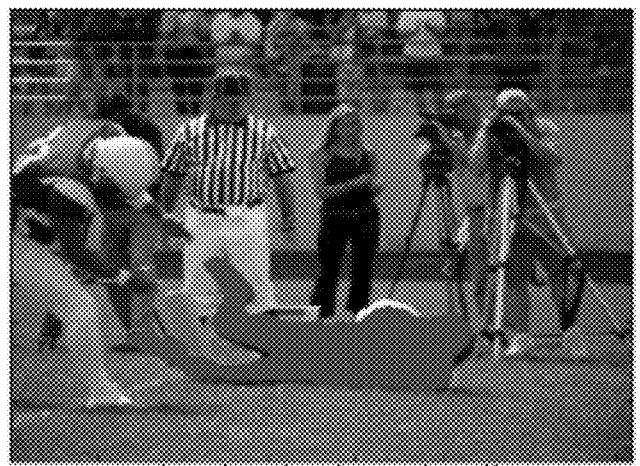

Example results of an embodiment of the rigid motion tracking algorithm using an affine transformation are shown in FIGS. 5A through 5F, which show example results of an implementation of the RigidICPTrackMaskPoints pseudocode on the Footballer sequence shown in FIGS. 2A through 2C. While an affine transformation is used in this embodiment, embodiments may use, but are not limited to, any one of affine transformation, similarity transformation, Euclidean transformation, perspective transformation, and simple translation to perform the transformations. The input images are from the Artbeats Digital Film Library. For this example, it takes twelve iterations for RigidICPTrackMaskPoints to converge. The results of the first three iterations are shown in FIGS. 5A through 5C, and the results of the last three iterations are shown in FIGS. 5D through 5F. The result of iteration 12, shown in FIG. 5F, is the final answer. Although the result of iteration 12 may appear to be a mask output, for the sake of simplicity, in these results all the points in M after transformation by the affine transformation A for the given iteration have been plotted.

Non-Rigid Motion Tracking Algorithm

Figure 6:
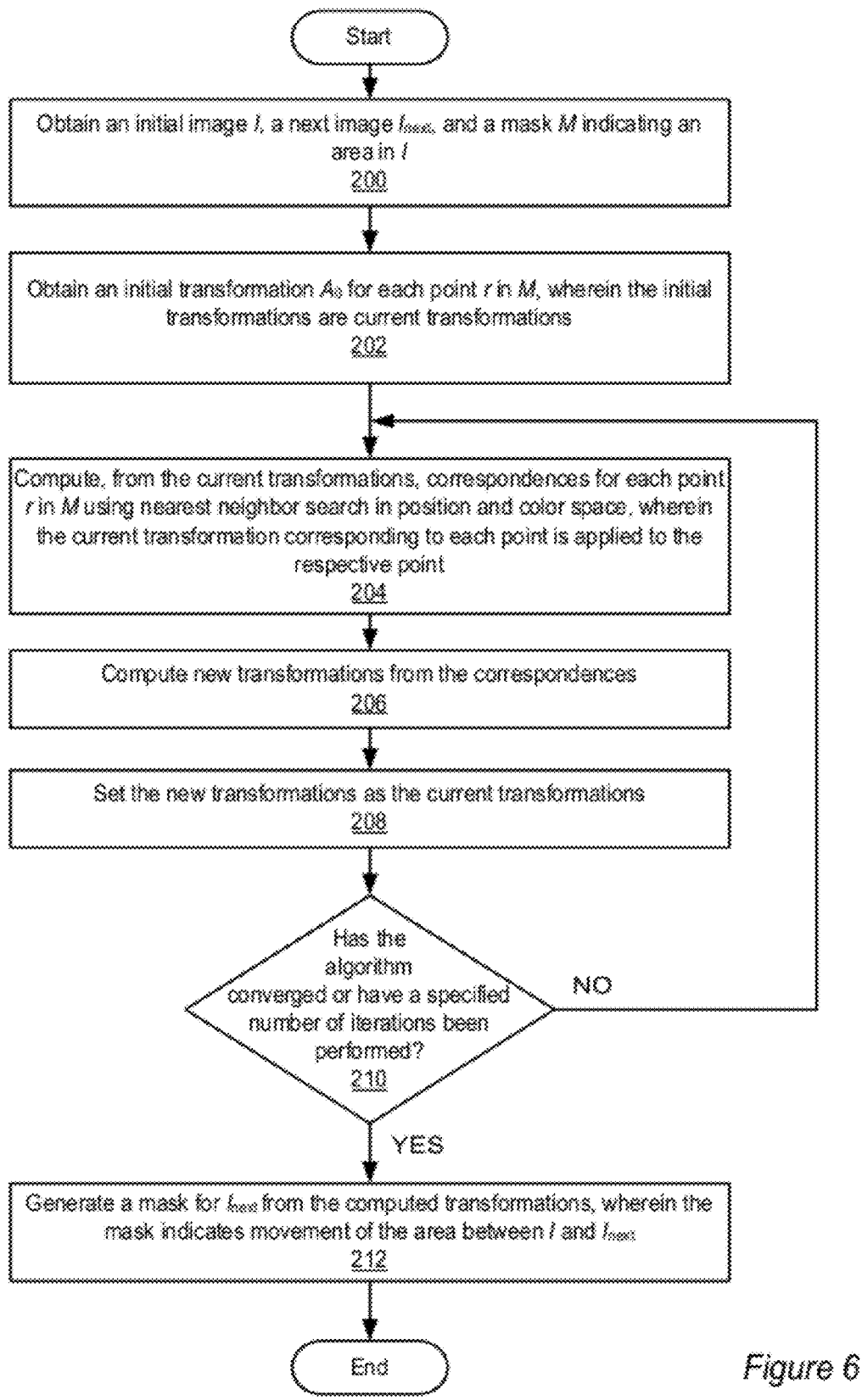
FIG. 6 is a flowchart of a non-rigid motion tracking method for tracking motion across two or more images, according to some embodiments.

FIG. 6 is a flowchart of a non-rigid motion tracking method for tracking motion across two or more images, according to embodiments. The non-rigid motion tracking method may be performed by a motion tracking module implemented by program instructions stored in a computer-readable storage medium and executable by one or more processors (e.g., one or more CPUs and/or GPUs).

As indicated at 200, an initial image I, a next image $I_{next}$, and a mask M indicating an area in I may be obtained. The images I and $I_{next}$ may, for example, be frames from a video, either adjacent in time or not adjacent in time, or simply images of a scene containing similar areas or objects. FIGS. 2A through 2C show an image I, a selection mask M indicating an area selected in I, and a second image $I_{next}$, respectively, as examples of input to the non-rigid motion tracking method. As indicated at 202, an initial transformation $A_0$ for each point r in M may be obtained. The initial transformations are set as current transformations.

As indicated at 204, correspondences for each point r in M may be computed from the current transformations using nearest neighbor search in position and color space. The current transformation corresponding to each point is applied to the respective point. As indicated at 206, new transformations are computed from the correspondences. As indicated at 208, the new transformations are set as the current transformations.

At 210, a check is made to see if the algorithm has converged or if a specified number of iterations have been performed. If not, the method returns to 204. If so, the method proceeds to 212. Thus, elements 204, 206 and 208 may be repeated until the algorithm converges or until a specified number of iterations have been performed. Embodiments may test for convergence using various methods, as previously described.

At 212, a mask for $I_{next}$ may be generated from the computed transformations. The generated mask indicates movement of the area indicated by mask M between I and $I_{next}$.

The following pseudocode for an embodiment of a non-rigid motion tracking algorithm, referred to as NonRigidICPTrackMaskPoints, is provided as an example, and is not intended to be limiting. The non-rigid motion tracking algorithm may be performed by a motion tracking module implemented by program instructions stored in a computer-readable storage medium and executable by one or more processors (e.g., one or more CPUs and/or GPUs):

function $\{A(r)\} =$ $$NonRigidICPTrackMaskPoints \left( \left[ \begin{array}{c} I, M, I_{next}, \\ \{A_0(r)\}, B_{next}^{con}, \\ \text{max\_motion\_in\_pixels}, \\ \text{max\_track\_points} \end{array} \right] \right)$$

if (!exist($B_{next}^{con}$))$B_{next}^{con}$(x, y):=0 ∀(x, y)

if (!exist(max_motion_in_pixels)) max_motion_in_pixels:=∞ if(!exist($\{A_0(r)\}$))

$$A_{rigid} := RigidICPTrackMaskPoints \begin{pmatrix} I, M, I_{next}, \\ [\;], B_{next}^{con}, \\ \text{max\_motion\_in\_pixels}, \\ \text{max\_track\_points} \end{pmatrix}$$

$A_0(r) := A_{rigid} \; \forall r \in M$
end if
$R := \{(x,y) : M(x,y) = 1\}$
if (exist(max_track_points) and $|R| >$ max_track_points)
$R :=$ PickSubsetOfSize(R, max_track_points)
end if
$R = \{r_i\}_{i=1}^{n}$
$S := \{(x,y) : 0 \leq x < \text{cols}, \; 0 \leq y > \text{rows}\}$
$S := S \cap \overline{B_{next}^{con}}$
$D :=$ DistanceTransform(M)
$S := S \cap \{(x, y) : D(x, y) \leq \text{max\_motion\_in\_pixels}\} = \{s_j\}_{j=1}^{N}$
$S^c := \{(s_j, \lambda I_{next}(s_j))\}_{j=1}^{N} = \{s_j^x, s_j^u, \lambda R_{next}(s_j), \lambda G_{next}(s_j), \lambda B_{next}(s_j)\} = \{s_j^c\}$
$A := A_0$
for iter=1:max_iterations
 // Solve for optimal correspondences $(r_i, s_{m(i)})$ given transformation A
 $u_i = A r_i \; \forall i = 1, \ldots, n$
 $R_c := \{u_i^x, u_i^y, \lambda R(r_i), \lambda G(r_i), \lambda B(r_i)\} = \{r_i^c\}_{i=1}^{n}$
 for i=1:n
  $s_{m(i)}^c := \arg\min_{s^c \in S^c} \|r_i^c - s^c\|_2^2$
 end for
 $S^m = \{S_{m(i)}\}_{i=1}^{n} \subset R^2$ // R signifies the set of real numbers
 if (converged) break
 // Solve for optimal transformation A given correspondences $(r_i, s_{m(i)})$
 $A^* := \arg\min_A \sum_{i=1}^{n} \|A r_i - s_{m(i)}\|_2^2$
 $A := A^*$
end for
end NonRigidICPTrackMaskPoints Referring to the above example pseudocode for a non-rigid motion tracking algorithm, the optional parameters $B_{next}^{con}$ and max_motion_in_pixels may be the same as in RigidICPTrackMaskPoints, as may be the setting of the sets R of points to track, S of candidate locations in $I_{next}$, and $S^c$ of candidate points from $I_{next}$ in position and color space. In some embodiments, NonRigidICPTrackMaskPoints computes one transformation per pixel, and thus the optional initial transformation input argument may be used to specify the transformation $A_0(r)$ at each point r in M. In some embodiments, if $\{A_0(r)\}$ is not provided, the algorithm may start with the identity transformation at each r. In another embodiment, shown in the example pseudocode, the algorithm starts with the single rigid transformation produced by running RigidICPTrackMaskPoints. The use of RigidICPTrackMaskPoints to initialize the iteration may provide a better starting point than the identity transformation if the motion of the selection between I and $I_{next}$ is large. The first portion of an iteration to find the best correspondences given the transformations is the same as in RigidICPTrackMaskPoints, except that each $r_i$ is pushed forward by a potentially different transformation $A(r_i)$.

Figure 7A:
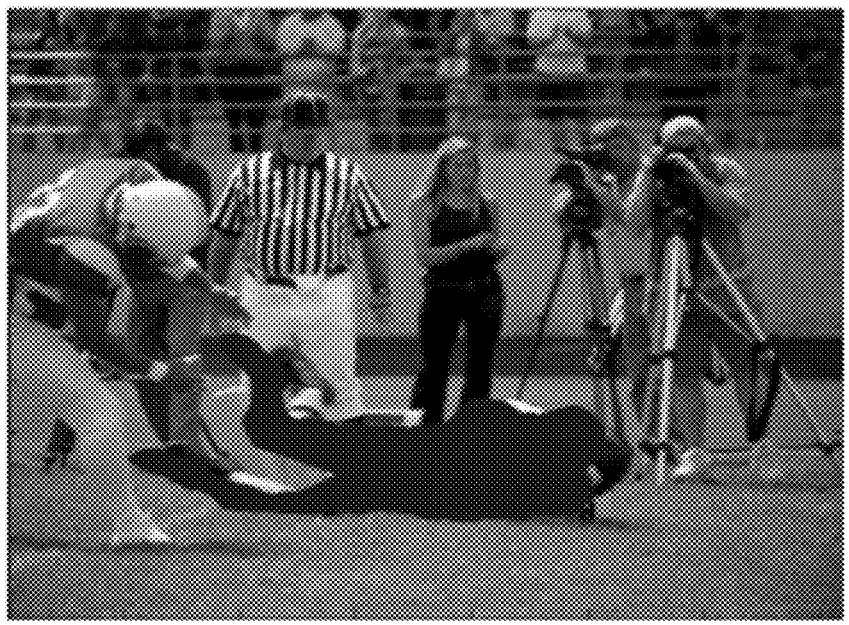
FIGS. 7A and 7B show example results of an embodiment of a non-rigid motion tracking algorithm on the image sequence shown in FIGS. 2A through 2C.
Figure 7B:
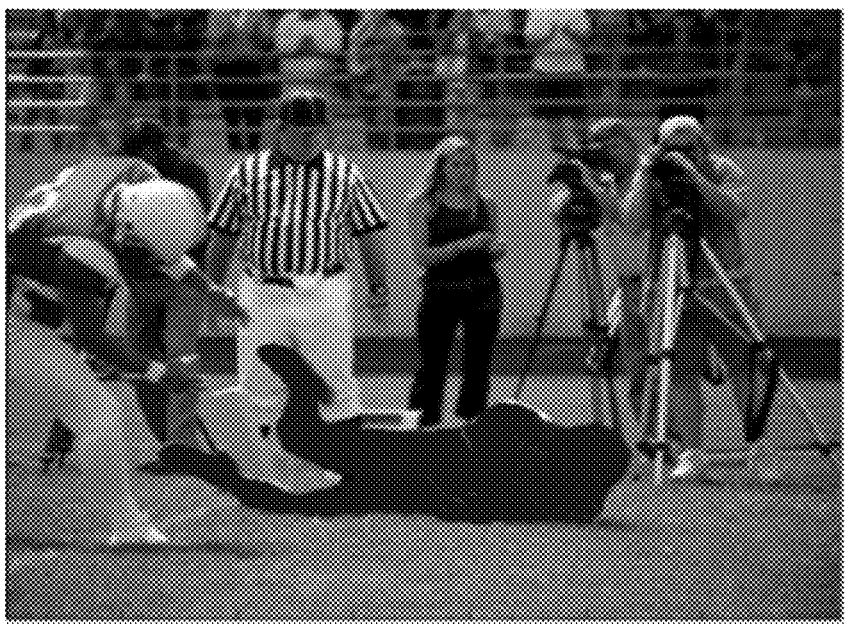

Example results of an embodiment of a non-rigid motion tracking algorithm using an affine transformations at each pixel are shown in FIGS. 7A and 7B, which show results of an implementation of the example NonRigidICPTrackMaskPoints pseudocode on the Footballer sequence shown in FIGS. 2A through 2C. While an affine transformation is used in this embodiment, embodiments may use, but are not limited to, any one of affine transformation, similarity transformation, Euclidean transformation, perspective transformation, and simple translation to perform the transformations. The input images are from the Artbeats Digital Film Library. For this example, it takes 23 iterations for NonRigidICPTrackMaskPoints to converge. The first and last ($23^{rd}$) iterations are shown in FIGS. 7A and 7B, respectively. Although the example NonRigidICPTrackMaskPoints pseudocode uses the result of RigidICPTrackMaskPoints as the initial transformation at all pixels, in this example, the iteration was started at the identity transformation for all pixels. This shows that NonRigidICPTrackMaskPoints can also track a large motion without starting close to the true answer. The final result shown in FIG. 7B is not a mask but rather is simply a plot of each point r in M after being warped by its affine transformation A(r). This explains why there appears to be some holes.

There is more flexibility in the non-rigid motion tracking algorithm than in the rigid motion tracking algorithm. Therefore, NonRigidICPTrackMaskPoints may be able to capture the shoulder and helmet better than RigidICPTrackMaskPoints. The final iteration (23) of the non-rigid motion tracking algorithm in FIG. 7B may be compared with the final iteration (12) of the rigid motion tracking algorithm shown in FIG. 5F.

Group Tracking Algorithm

Figure 8:
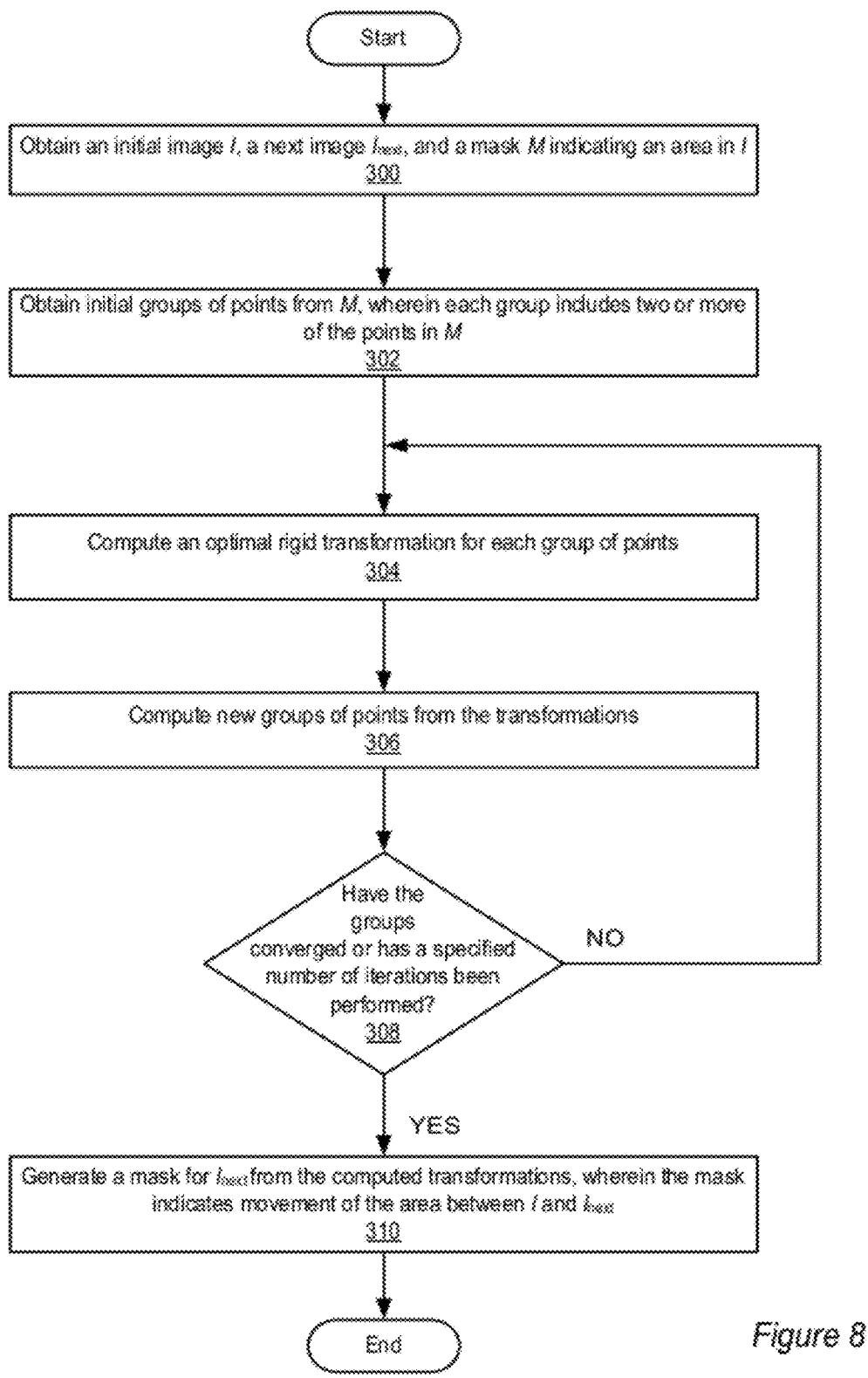
FIG. 8 is a flowchart of a group motion tracking method for tracking motion across two or more images, according to some embodiments.

FIG. 8 is a flowchart of a group motion tracking method for tracking motion across two or more images, according to some embodiments. The group motion tracking method may be performed by a motion tracking module implemented by program instructions stored in a computer-readable storage medium and executable by one or more processors (e.g., one or more CPUs and/or GPUs).

As indicated at 300, an initial image I, a next image $I_{next}$, and a mask M indicating an area in I may be obtained. The images I and $I_{next}$ may, for example, be frames from a video, either adjacent in time or not adjacent in time, or simply images of a scene containing similar areas or objects. FIGS. 2A through 2C show an image I, a selection mask M indicating an area selected in I, and a second image $I_{next}$, respectively, as examples of input to the group motion tracking method. As indicated at 302, initial groups of points from M may be obtained; each group includes two or more of the points in M. Note, however, that, in some cases, it may be possible that at least one of the groups may include only one of the points in M. To obtain the initial groups of points, the group motion tracking method may group the points indicated by M into N groups, where N is an integer greater than or equal to two. Alternatively, the initial groups may be previously determined by a manual or automated method and provided as input to the group motion tracking method.

As indicated at 304, an optimal rigid transformation may be computed for each group, for example using the method indicated by elements 102 through 110 of FIG. 4 applied to each group. In this method, an initial transformation $A_0$ may be obtained for each group; thus, there are N initial transformations, each corresponding to a respective group. The initial transformations are set as current transformations. Correspondences for each point in each group are computed from the current transformations using nearest neighbor search in position and color space (element 104 of FIG. 4). The current transformation corresponding to a group is applied to each point in the respective group. New transformations for the groups are computed from the computed correspondences for the respective groups. The new transformations are set as the current transformations for the respective groups. A check is made to see if the transformations have converged or if a specified number of iterations have been performed. If so, processing of this group is done; if not, the method returns to 104. Thus, elements 104 through 110 of FIG. 4 are repeated for each group until the algorithm converges or until a specified number of iterations have been performed for each group.

As indicated at 306, the pixels in mask M may be regrouped into N new groups according to the computed new transformations for the groups. At 308, a check may be made to determine if the groups have converged, or to determine if a specified number of iterations of elements 304 and 306 have been performed. If so, the method proceeds to 310; if not, the method returns to 304. Embodiments may test for convergence using various methods, fore example the methods as previously described.

At 310, a mask for $I_{next}$ may be generated from the computed transformations from the last iteration. The generated mask indicates movement of the area indicated by mask M between I and $I_{next}$.

The following pseudocode for an embodiment of a group tracking algorithm, referred to as GroupICPTrackMaskPoints, is provided as an example, and is not intended to be limiting. The group motion tracking algorithm may be performed by a motion tracking module implemented by program instructions stored in a computer-readable storage medium and executable by one or more processors (e.g., one or more CPUs and/or GPUs):

function $[\{A_g\}_{g=1}^{num\_groups}, G] =$ $$GroupICPTrackMaskPoints \begin{pmatrix} I, M, I_{next}, \text{num\_groups}, \\ B_{next}^{con}, \\ \text{max\_motion\_in\_pixels} \end{pmatrix}$$

if (!exist($B_{next}^{con}$))$B_{next}^{con}$(x, y):=0 ∀(x, y)
if (!exist(max_motion_in_pixels)) max_motion_in_pixels:=∞
R:={(x,y):M(x,y)=1}={$r_i$}$_{i=1}^n$
S:={(x,y):0≤x<cols, 0≤y>rows}
S:=S∩$B_{next}^{con}$
D:=DistanceTransform(M)
S:=S∩{(x, y): D(x, y)≤max_motion_in_pixels}={$s_j$}$_{j=1}^N$
$S^c$:={($s_j$, λ$I_{next}(s_j)$)}$_{j=1}^N$={$s^x_j$, $s^u_j$, λ$R_{next}(s_j)$, λ$G_{next}(s_j)$, λ$B_{next}(s_j)$}={$s^c_j$}
G:=AssignInitialGroups(R,num_groups)
// G(i)=group number to which $r_i$ belongs
for g=1:num_groups
  $A_g$:=identity transformation
  // $A_g$=rigid transformation for all points in group number g
end for
for iter=1:max_iterations
// Solve for optimal rigid transformation $A_g$ for each group g
for g=1:num_groups
  $M_g(r)$:=0 if M (r)=0 or G(r)≠g
  $M_g(r)$:=1 if G(r)=g $$A_g := RigidICPTrackMaskPoints \begin{pmatrix} I, M_g, I_{next}, A_g, B_{next}^{con}, \\ \text{max\_motion\_in\_pixels} \end{pmatrix}$$

for i=1:n $[S_{m_g(i)}^c, D_g(i)]:=\min_{s^c \in S^c} \|r_i^c - s^c\|_2^2$
end for
end for // Solve for optimal groups g=G($r_i$) given the rigid transformation $A_g$ for each group g $$G := SolveLabelingProblem \begin{pmatrix} \{A_g\}_{g=1}^{num\_groups}, \{D_g\}_{g=1}^{num\_groups}, \{m_g\}_{g=1}^{num\_groups}, \\ G, I, M, I_{next}, \text{num\_groups} \end{pmatrix}$$

end for
end GroupICPTrackMaskPoints

Referring to the above example pseudocode for a group tracking algorithm, this algorithm computes a non-rigid transformation of the points in M in that there is not a single rigid transformation. However, instead of allowing a potentially different transformation at each point in M, only a given number (indicated by num_groups) of rigid transformations are allowed. Each point $r_i$ in M is assigned to a different group g=G(i) by AssignInitialGroups, and there is a rigid transformation $A_g$ for each group g=1, . . . , num_groups. Alternatively, instead of the a group tracking algorithm assigning the points to initial groups, the initial groups may be previously determined by a manual or automated method and provided as input to the group tracking algorithm. Embodiments of the group tracking algorithm may discover and return the appropriate groups and rigid transformations. In some embodiments, the optional parameters $B_{next}^{con}$ and max_motion_in_pixels are as in RigidICPTrackMaskPoints. Some embodiments may include optional inputs for initial groupings and/or transformations; however, for simplicity, these are computed inside GroupICPTrackMaskPoints in the example pseudocode. In the example embodiment, the initial group assignments may be performed by the routine AssignInitialGroups, which assigns groups based on position within M so that, initially, there are connected areas of pixels assigned to the same groups. Some embodiments may set the initial transformations for each group to the identity transformation. For simplicity, the optional input max_track_points is not included in the example pseudocode.

In some embodiments, each iteration of GroupICPTrackMaskPoints may include num_groups calls to RigidICPTrackMaskPoints in order to compute the best rigid transformation $A_g$ for each group g given the current groupings, and a call to SolveLabelingProblem to compute new groups based on the current transformations. In some embodiments, the call to RigidICPTrackMaskPoints to compute $A_g$ may be passed the current $A_g$ as the initial transformation. In some embodiments, after computing $A_g$, the distances $D_g$(i) of each $r_i^c$ to the closest point $s_{m(i)}^c \in S^c$ in position and color space may be computed for use in the subsequent grouping problem. The distances $D_g$(i) gives a measure of how good the transformation $A_g$ is for the point $r_i$ in M.

In order to reassign groups in the call to SolveLabelingProblem, the group tracking algorithm may account for whether transformation $A_g$ maps $r_i$ close to a point in $I_{next}$ of similar color, and also may keep nearby pixels in M having the same grouping (and therefore same transformation) in order to keep the shape of the tracked points similar to the initial selection M. In some embodiments, one of the groups g=1, . . . , num_groups may be assigned for each pixel r∈M. This is an image labeling problem. If $r_i$ is labeled as group g, then, for example, a cost of $D_g$(i) may be incurred in the objective function.

To keep the underlying transformation for the whole of M as rigid as possible, some embodiments may consider the label assigned to neighboring pixels and encourage labels of neighboring pixels to match as often as possible, while respecting good labelings suggested by the data $\{D_g(i)\}_{g=1}^{num\_groups}$. This is a standard problem in computer vision. The simplest neighbor penalty V is a constant penalty for every pair of neighboring pixels that are assigned different labels. Other neighbor costs V that use the underlying image are possible, for example to encourage label region boundaries to occur along color/intensity edges in the image. Another example of a neighbor penalty V that may be used in some embodiments is to encourage locations $A_p(p)$ and $A_q(q)$ to be close if pixels p and q are neighboring pixels. If there are two pixels p and q that are next to each other, and transformations $A_p$ and $A_q$ are applied to those pixels, this encourages the new locations to also be close, which may help to prevent the mask from pulling apart.

Labeling algorithms seek labelings that minimize D+V to produce smooth labelings that match the data well. Two example algorithms that may be used in some embodiments are belief propagation and a graphcut-based α-expansion algorithm; however, various other algorithms may be used in embodiments.

Figure 9:
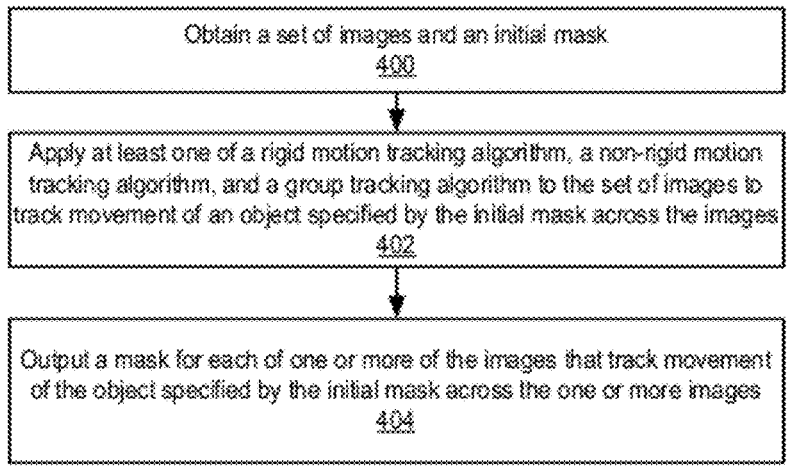
FIGS. 9 and 10 are high-level flowcharts that illustrate operations of embodiments of a motion tracking module that may implement embodiments of one or more of the motion tracking algorithms.
Figure 10:
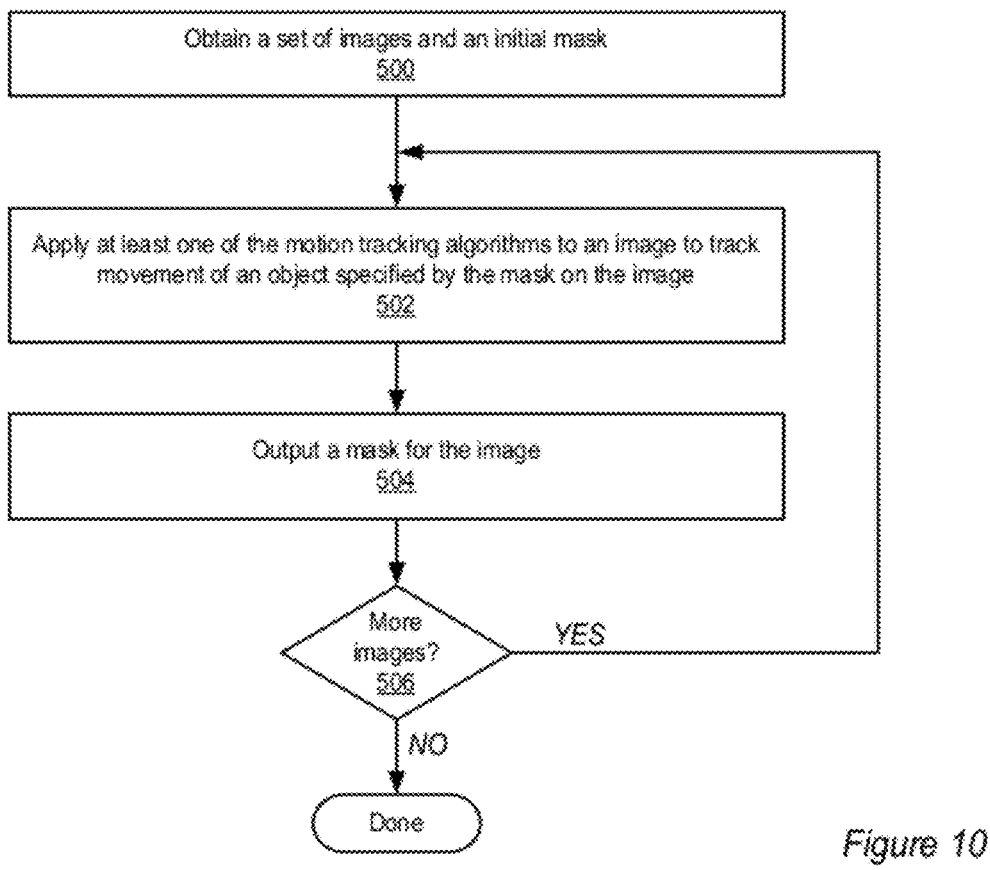

FIGS. 9 and 10 are high-level flowcharts that illustrate operations of embodiments of a motion tracking module as described herein. Referring to FIG. 9, as indicated at 400, the motion tracking module obtains a set of input images and an initial mask. Alternatively, the motion tracking module may automatically generate, or may be used to generate, an initial mask. The images may be a collection of two or more related photographic images, for example images taken in sequence with a camera, or a video clip containing two or more frames, with each frame an image. The images may have been captured as digital images or, alternatively, may have been otherwise captured, e.g. using conventional film, and subsequently digitized. As indicated at 402, the motion tracking module applies at least one of the motion tracking algorithms described herein, e.g. a rigid motion tracking algorithm, a non-rigid motion tracking algorithm, and a group tracking algorithm, to the set of images to track movement of an object specified by the initial mask across the images. As indicated at 404, the motion tracking module outputs a mask for each of one or more of the images; the masks track movement of the object specified by the initial mask across the one or more one images.

If there is more than one input image for which motion is to be tracked, the new mask may be applied to a third image, and so on, to generate a sequence of masks for the set of input images that, for example, track motion of an object across the images, as illustrated in FIG. 10. In FIG. 10, as indicated at 500, the motion tracking module obtains a set of input images and an initial mask. As indicated at 502, the motion tracking module applies at least one of the motion tracking algorithms described herein to an image to track movement of an object specified by the mask on the image. As indicated at 504, the motion tracking module outputs a mask for the image. At 506, if there are more images to be processed, then the motion tracking module returns to 502 to process a next image in the sequence of images using the newly generated mask. In some embodiments, a user may modify a mask generated for an image before the method proceeds to the next image; the user-modified mask may then be used to process the next image. In some embodiments, one or more user interface elements may be provided whereby the user may modify a mask.

Using Other Point Features, Properties or Characteristics in an ICP Algorithm

Embodiments of methods for robust rigid and non-rigid motion tracking are described above in which iterative closest point algorithms in a combined position and color space are used to perform robust rigid and non-rigid motion tracking. Embodiments are described that implement nearest neighbor searching not just in position space (i.e., using spatial information for the points) as in conventional methods, but in color space as well (i.e. using color information for the points). However, in some embodiments, other features, properties or characteristics of points in images may be used in combination with spatial information instead of or in addition to color information in a nearest neighbor searching technique.

Examples of other features, properties or characteristics of points that may be used include, but are not limited to, texture and edges. For example, some embodiments may compute a texture descriptor, for example as a vector of N values generated by applying N filters to a region around a point. The filters may, for example, measure at a point how much energy there is at a particular frequency, orientation, etc. Other types of filters may be used to generate values that may be used in a texture feature. The texture feature may be used in the nearest neighbor searching technique instead of, or in addition to, the color feature.

Edges are an example of a binary feature that may be used. Some embodiments may apply one or more techniques to determine if a point is along an edge in an image. An edge may, for example, be defined as a rapid change in color, or some other characteristic, over a small distance in the image. A binary value, e.g. 0 or 1, may be determined for points that indicates whether the point is on an edge or not. The binary edge value may then be used in the nearest neighbor searching technique instead of, or in addition to, the color feature.

In addition, some embodiments may use a combination of two or more features in addition to the spatial information; for example, some embodiments may use a vector with color values (e.g., RGB values), N texture values, and an edge indication in the nearest neighbor searching technique.

Example Implementations

The rigid, non-rigid, and group motion tracking algorithms described herein, alone or in combination with one or more others of the motion tracking algorithms, may be performed by a motion tracking module implemented by program instructions stored in a computer-readable storage medium and executable by one or more processors (e.g., one or more CPUs and/or GPUs). FIG. 11 illustrates an example embodiment of a motion tracking module that may implement one or more of the above-described methods. The one or more motion tracking algorithms may be implemented as submodules of the motion tracking module 600. Some embodiments of the motion tracking module 600 may be implemented, for example, as a plug-in for image processing or video processing tools or applications. Other embodiments may be otherwise implemented, for example as a stand-alone program or utility, or as a library function.

Some embodiments of motion tracking module 600 may implement an embodiment of the rigid motion tracking algorithm as described herein as rigid motion tracking submodule 604. Some embodiments of motion tracking module 600 may implement an embodiment of the non-rigid motion tracking algorithm as described herein as rigid motion tracking submodule 606. Some embodiments of motion tracking module 600 may implement an embodiment of the group tracking algorithm as described herein as group tracking submodule 608. Various embodiment of motion tracking module 600 may implement only one of the submodules 604, 606, and 608, any two of the submodules 604, 606, and 608, or all three of the submodules 604, 606, and 608.

While FIG. 11 illustrates and the above discussion describes motion tracking module 600 as implementing motion tracking algorithms as described herein as submodules 604, 606, and 608, and as implementing only one of the modules, any two of the submodules 604, 606, and 608, or all three of the submodules 604, 606, and 608, it is important to note that each motion tracking algorithm described herein may be implemented as a separate module, function or routine, for example as a function or module in an image processing or video processing application or as a library function that may be called by, for example, one or more other functions or modules of an image processing or video processing application.

In operation, motion tracking module 600 obtains a set of input images 610 and an initial mask corresponding to an object in one of the images 612 to be tracked across the images 612. Alternatively, motion tracking module 600 may automatically generate, or may be used to generate, a mask 612. Input images 610 may be a collection of two or more related photographic images, for example images taken in sequence with a camera, or a video clip containing two or more frames, with each frame an image 610. Images 610 may have been captured as digital images or, alternatively, may have been otherwise captured, e.g. using conventional film, and subsequently digitized. Motion tracking module 600 then applies one or more of the motion tracking algorithms described herein, implemented as submodules 604, 606, and 608, to the input images 610 according to the mask 612 to generate motion tracking results 622. Mask 612 may specify a selected region in a first image 610, and results 622 may include a mask for a predicted selection or region in a second image 610. If there is more than one input image for which motion is to be tracked, the new mask may be applied to a third image, and so on, to generate a sequence of masks for the set of input images 610 that, for example, track motion of an object across the images 610.

Some embodiments of the motion tracking module 600 may provide a user interface 602 that provides one or more textual and/or graphical user interface elements, modes or techniques via which a user may modify, indicate or select images 610 and./or masks 612 as input to the module 600. The user interface 602 may also provide one or more textual and/or graphical user interface elements, modes or techniques via which a user may enter, modify, indicate or select input parameters, thresholds, etc., used by motion tracking module 600, and in general provide input to and/or control various aspects of motion tracking using embodiments of the motion tracking module 600 as described herein. In some embodiments, motion tracking module 600 may provide real-time or near-real-time feedback to the user via dynamic display on a display device(s) of results of motion tracking made according to the user input via user interface 602. Results 622 of the motion tracking performed according to one or more of the motion tracking algorithms described herein may be provided. For example, results 622 may be displayed on a display device, printed, and/or written to or stored on any of various types of memory media, such as storage media or storage devices. Alternatively, or in addition, results 622 may be provided to another local or remote program, application, or module, for example for further processing in, or use by, an image or video processing workflow.

Example System

Figure 12:
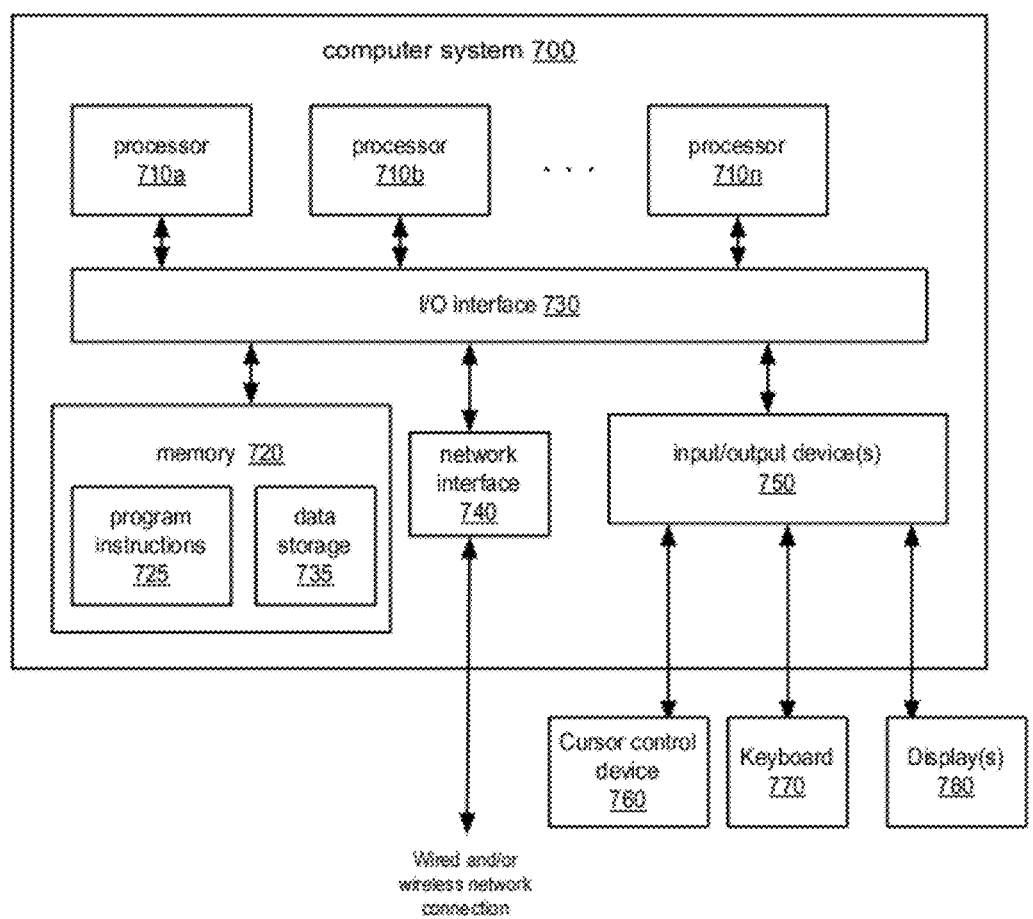
FIG. 12 illustrates an example of a computer system that may be used in embodiments.

Various components of embodiments of a motion tracking module as described herein may be executed on one or more computer systems, which may interact with various other devices. One such computer system is illustrated by FIG. 12. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in some embodiments, some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods and algorithms disclosed herein for motion tracking may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a motion tracking module, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In some embodiments, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 12, memory 720 may include program instructions 725, configured to implement embodiments of a motion tracking module as described herein, and data storage 735, comprising various data accessible by program instructions 725. In some embodiments, program instructions 725 may include software elements of a s motion tracking module as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of a motion tracking module as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method for tracking motion across images, comprising:
   obtaining an image of a scene, a mask corresponding to an area in the image, and a next image of the scene, wherein the area includes a plurality of points, wherein each point indicates a location of the point in a position space and a color of the point in a color space;

applying an iterative closest point algorithm to the area in the image indicated by the mask and the next image, wherein the iterative closest point algorithm tracks motion of the area in the image between the image and the next image, and wherein the iterative closest point algorithm matches points indicated by the mask to points in the next image in both position space and color space; and generating an indication of an area in the next image that corresponds to the area in the image as tracked by the iterative closest point algorithm.

2. The computer-implemented method as recited in claim 1, wherein said applying an iterative closest point algorithm to the area in the image indicated by the mask and the next image comprises:

obtaining a transformation for the area in the image indicated by the mask as a current transformation; and repeating:

applying the current transformation to the mask to generate a warped mask indicating a set of points transformed in position space and color space according to the current transformation;

determining correspondences for the set of points indicated by the warped mask in the next image, wherein said determining correspondences comprises, for each point in the warped mask, locating a corresponding point in the next image that is a closest match to the respective point in the warped mask using a nearest neighbor search technique in position space and in color space;

computing a new current transformation for the area in the image indicated by the mask from the determined correspondences; and checking one or more criteria to determine if the current transformation is a final transformation;

until the final transformation is reached.

3. The computer-implemented method as recited in claim 2, wherein said generating an indication of an area in the next image that corresponds to the area in the image as tracked by the iterative closest point algorithm comprises generating a mask for the next image from the final transformation, wherein the mask for the next image indicates movement of the area between the image and the next image.

4. The computer-implemented method as recited in claim 2, wherein the one or more criteria include an iteration count, and wherein said checking one or more criteria to determine if the current transformation is a final transformation comprises checking to determine if the iteration count has reached a specified iteration threshold.

5. The computer-implemented method as recited in claim 2, wherein the one or more criteria include one or more convergence criteria, and wherein said checking one or more criteria to determine if the current transformation is a final transformation comprises checking to determine if the iterative closest point algorithm has converged according to at least one of the one or more convergence criteria.

6. The computer-implemented method as recited in claim 5, wherein the one or more convergence criteria include a transformed point convergence criteria, and wherein said checking to determine if the iterative closest point algorithm has converged according to at least one of the one or more convergence criteria comprises checking to determine if positions of transformed points have not changed by more than a specified distance from a previous iteration of the iterative closest point algorithm.

7. The computer-implemented method as recited in claim 5, wherein the one or more convergence criteria include a correspondence convergence criteria, and wherein said checking to determine if the iterative closest point algorithm has converged according to at least one of the one or more convergence criteria comprises checking to determine if the correspondences have not changed from a previous iteration of the iterative closest point algorithm.

8. The computer-implemented method as recited in claim 2, wherein the current transformation specifies a single transformation to be applied to the points in the mask, and wherein said applying the current transformation to the mask to generate a warped mask comprises applying the same transformation to each point in the mask.

9. The computer-implemented method as recited in claim 2, wherein the current transformation specifies a plurality of transformations each corresponding to a respective one of the plurality of points in the mask, and wherein said applying the current transformation to the mask to generate a warped mask comprises applying each of the plurality of transformations to a respective one of the plurality of points in the mask.

10. The computer-implemented method as recited in claim 9, wherein said computing a new current transformation for the area in the image indicated by the mask from the determined correspondences comprises computing a new transformation for each of the plurality of points.

11. The computer-implemented method as recited in claim 2, further comprising obtaining a plurality of groups of the plurality of points, wherein each group includes two or more of the plurality of points, wherein said obtaining a transformation for the area in the image indicated by the mask as a current transformation comprises obtaining a transformation for each of the plurality of groups, wherein said applying the current transformation to the mask to generate a warped mask comprises applying the transformation for each of the plurality of groups to each of the plurality of points in the respective group.

12. The computer-implemented method as recited in claim 11, wherein said computing a new current transformation for the area in the image indicated by the mask from the determined correspondences comprises computing a new transformation for each of the plurality of groups, wherein the new transformations for the plurality of groups are collectively the new current transformation.

13. The computer-implemented method as recited in claim 11, further comprising regrouping the plurality of points to form a new plurality of groups after said computing a new current transformation for the area in the image indicated by the mask from the determined correspondences.

14. A system, comprising:

at least one processor; and a memory comprising program instructions, wherein the program instructions are executable by the at least one processor to:

obtain an image of a scene, a mask corresponding to an area in the image, and a next image of the scene, wherein the area includes a plurality of points, wherein each point indicates a location of the point in a position space and a color of the point in a color space;

apply an iterative closest point algorithm to the area in the image indicated by the mask and the next image, wherein the iterative closest point algorithm tracks motion of the area in the image between the image and the next image, and wherein the iterative closest point algorithm matches points indicated by the mask to points in the next image in both position space and color space; and generate an indication of an area in the next image that corresponds to the area in the image as tracked by the iterative closest point algorithm.

15. The system as recited in claim 14, wherein, to apply an iterative closest point algorithm to the area in the image indicated by the mask and the next image, the program instructions are executable by the at least one processor to:

obtain a transformation for the area in the image indicated by the mask as a current transformation; and repeat:

apply the current transformation to the mask to generate a warped mask indicating a set of points transformed in position space and color space according to the current transformation;

determine correspondences for the set of points indicated by the warped mask in the next image, wherein, to determine correspondences, the program instructions are executable by the at least one processor to, for each point in the warped mask, locate a corresponding point in the next image that is a closest match to the respective point in the warped mask using a nearest neighbor search technique in position space and in color space;

compute a new current transformation for the area in the image indicated by the mask from the determined correspondences; and check one or more criteria to determine if the current transformation is a final transformation;

until the final transformation is reached.

16. The system as recited in claim 15, wherein the current transformation specifies a single transformation to be applied to the points in the mask, and wherein, to apply the current transformation to the mask to generate a warped mask, the program instructions are executable by the at least one processor to apply the same transformation to each point in the mask.

17. The system as recited in claim 15, wherein the current transformation specifies a plurality of transformations each corresponding to a respective one of the plurality of points in the mask, and wherein, to apply the current transformation to the mask to generate a warped mask, the program instructions are executable by the at least one processor to apply each of the plurality of transformations to a respective one of the plurality of points in the mask.

18. A non-transitory computer-readable storage medium storing program instructions, wherein the program instructions are computer-executable to implement a motion tracking module configured to:

obtain an image of a scene, a mask corresponding to an area in the image, and a next image of the scene, wherein the area includes a plurality of points, wherein each point indicates a location of the point in a position space and a color of the point in a color space;

apply an iterative closest point algorithm to the area in the image indicated by the mask and the next image, wherein the iterative closest point algorithm tracks motion of the area in the image between the image and the next image, and wherein the iterative closest point algorithm matches points indicated by the mask to points in the next image in position space and according to one or more other features of the points; and generate an indication of an area in the next image that corresponds to the area in the image as tracked by the iterative closest point algorithm.

19. The non-transitory computer-readable storage medium as recited in claim 18, wherein, to apply an iterative closest point algorithm to the area in the image indicated by the mask and the next image, the motion tracking module is configured to:

obtain a transformation for the area in the image indicated by the mask as a current transformation; and repeat:

apply the current transformation to the mask to generate a warped mask indicating a set of points transformed in position space and color space according to the current transformation;

determine correspondences for the set of points indicated by the warped mask in the next image, wherein, to determine correspondences, the motion tracking module is configured to, for each point in the warped mask, locate a corresponding point in the next image that is a closest match to the respective point in the warped mask using a nearest neighbor search technique that uses positions of the points and the one or more other features of the points to locate closest matching points;

compute a new current transformation for the area in the image indicated by the mask from the determined correspondences; and check one or more criteria to determine if the current transformation is a final transformation;

until the final transformation is reached.

20. The non-transitory computer-readable storage medium as recited in claim 19, wherein the one or more other features of the points include color values of the points, texture values of the images around the points, and binary values indicating whether the points are or are not located on edges in the images.

* * * * *